| United States Patent [19] | [11] 3,733,906 |
|---|---|
| Barnhardt et al. | [45] May 22, 1973 |

[54] METHOD AND APPARATUS FOR THE CONTINUOUS WITHDRAWAL OF SAMPLES FROM INDUSTRIAL PROCESS BATHS OR THE LIKE FOR ANALYSIS

[75] Inventors: Robert W. Barnhardt, Concord; William J. Grubbs, Charlotte, both of N.C.

[73] Assignee: Zellweger AG, Uster, Switzerland

[22] Filed: Nov. 23, 1970

[21] Appl. No.: 91,983

[52] U.S. Cl. ..............................................73/421 B
[51] Int. Cl. ................................................G01n 1/14
[58] Field of Search ..................73/421 B, 421.5 A, 73/422 R

[56] References Cited

UNITED STATES PATENTS

| 1,809,325 | 6/1931 | Austin | 73/421.5 A |
| 3,046,791 | 7/1962 | Dintern | 73/422 |
| 3,437,452 | 4/1969 | Bell et al. | 73/421 B |
| 3,457,787 | 7/1969 | Maatsch et al. | 73/421.5 A |

*Primary Examiner*—S. Clement Swisher
*Attorney*—Werner W. Kleeman

[57] ABSTRACT

A method and apparatus is disclosed for drawing a filtered sample from a solution or bath, especially an industrial process bath, for continuous or continual analysis. This invention involves periodically blowing a suitable pressurized fluid medium compatible with the bath, that is one which does not affect the sampling process, typically air, although other media can be employed, into the sampling bath on the downstream side of a filter. Backwash of the filter with air initially forces the clean filtered sample back through the filter, then such pressurized fluid medium itself is forced back through the filter for a brief time, after which the flow of such fluid medium is stopped, allowing normal liquid filter flow to resume.

8 Claims, 3 Drawing Figures

METHOD AND APPARATUS FOR THE CONTINUOUS WITHDRAWAL OF SAMPLES FROM INDUSTRIAL PROCESS BATHS OR THE LIKE FOR ANALYSIS

BACKGROUND OF THE INVENTION

The present invention relates to a new and improved method of, and apparatus for, the continuous withdrawal of samples from solutions or baths, especially industrial process baths for analysis of the withdrawn sample, making use of filter means for segregating the suspended particles or the like contained in the bath from the sample to be analyzed.

The proper functioning of automatic analysis equipment widely depends upon maintaining the sample to be analyzed free from suspended particles or the like. When it is considered that existing automatic analysis equipment work with, for instance, suitable sampling or dosing pumps, the valve elements or the sampling channels of which can be readily clogged by these suspended particles or other foreign materials contained in the bath solution, the importance of removing such particles becomes apparent. Moreover, the indication techniques utilized in conjunction with the analysis procedure for arriving at the analysis can similarly be adversely affected by the suspended particles, particularly then, if, for instance, the suspended particles contained in the sample tend to deposit upon measuring electrodes used in the analysis process, or in the case of photometric measurements cause disturbing light-scattering in the measuring cell or vessel.

With the recognition of these existing problems those concerned with this particular art have attempted to resort to certain measures to alleviate or avoid these drawbacks, relying particularly upon filtering of the sample to be analyzed. Hence, constructions of automatic analysis equipment have become known to the art which make use of filter elements at the infeed side of the sample at a branch stream, which filter elements are formed of a fine-pored material, for instance fritted glass or foamed materials composed or organic high-polymers. These type filters enable the sample to be processed in such a manner that an almost completely clear solution appears at the filter downstream side. Yet, sample filtering to that degree brings with it the drawback that the pores of the filter material quickly become clogged. Hence, even after a relatively short operating time, the throughflow resistance of the filter for the sample markedly increases to such an extent that finally the filter is no longer capable of passing any additional sample. In those situations, it is then almost indispensible to resort to techniques which monitor the effectiveness of the filter, for instance by measuring the pressure gradient or drop across the filter. When the filter element becomes clogged, it must be replaced, in turn, increasing maintenance operations of the analysis equipment, and, therefore, these factors must be generally construed as a drawback of such type systems.

A still further disadvantage of the state-of-the-art filter systems can be found in the increased "downtime" or so called "dead period" of the automatic analysis equipment which automatically is present because of its original or specific volume. Under the expression "dead period" or "downtime," as used in the context of this application, there is to be understood that time interval which passes until, with a sudden change in the concentration of the solution which is to be monitored, the automatic analysis equipment responds. Longer dead periods are especially then critical if following the automatic analysis equipment there is coupled a controller which, in the event of deviation of the concentration of the solution from a reference value, performs an automatic correction of the concentration. During these experimentations it was recognized, especially in the case of non-optical measuring techniques, that it was wholly unnecessary to filter the sample until obtaining a completely clear solution. Quite to the contrary, it was found that removal of only such suspended particles was really necessary which might lead to disturbances or malfunction of the particular piece of analysis equipment then being employed.

SUMMARY OF THE INVENTION

Accordingly, there is a real need in the art for an improved method of, and apparatus for, drawing filtered samples from an industrial process bath or the like for continuous or continual analysis, which is not associated with the aforementioned drawbacks of the prior art techniques and systems. Hence, a primary objective of the present invention is to provide just such a method and apparatus for the performance thereof which capably and reliably fulfills the existing need and is not associated with the aforementioned drawbacks of the prior art enumerated above.

Another and more specific object of the present invention relates to an improved method of preventing filter elements used in automatic analysis equipment from becoming clogged to thereby enable continuous or continual analysis, which method specifically contemplates periodically blowing a suitable fluid medium, typically air, although other fluid mediums can be used, into the sampling system on the downstream side of the filter, to thereby prevent particle build-up on such filter.

Still a further significant object of the present invention relates to an improved method of, and apparatus for, the continuous drawing of a sample from industrial process baths for continuous analysis, the inventive aspects contemplating increasing the useful life of the filter element or elements filtering the sample by back-washing the filter with a suitable fluid medium which prevents particles from building-up on the filter, the fluid medium itself being selected so as to avoid interfering with the analysis operation and adversely affecting the process bath, as excess fluid medium rises to the surface of the bath and does not change its chemical composition or make-up.

Now, in order to implement these and still further objects of the invention, which will become more readily apparent as the description proceeds, the inventive method for the continuous withdrawal of samples from solutions or baths, especially industrial process baths, for the continuous or continual analysis, contemplates the use of at least one filter for removing suspended particles contained in the bath from the sample to be analyzed. According to important method aspects of this invention, periodic surges of a pressurized medium are applied to the downstream side of the filter at which the sample is removed, the pressurized fluid medium flowing through the filter contra the direction in which the sample is normally removed, thereby detaching or loosening suspended particles which may have deposited upon the filter at the side of the bath.

Not only is the present invention concerned with the aforementioned method aspects, but additionally there is significantly taught a new and improved apparatus for the performance of the aforesaid method. The apparatus of the invention embodies a filter compartment communicating via a line or conduit with a suitable source of pressurized fluid medium, a control valve being operably coupled with such conduit for controlling admission of the pressurized fluid medium.

A further aspect of this invention contemplates controlling the control valve, preferably by a timer, in such a manner that it opens for a short period, for instance 0.5 seconds, followed by a relatively long valve closing time, for instance about 100 seconds, and these valve-opening- and closing operations cyclically follow one another in sequence. The flow time of the pressurized fluid medium, which can be conveniently referred to as the "pressure-on" period, is maintained relatively short to allow for uninterrupted sample flow, and equally the time-interval where no pressurized medium flows, similarly conveniently referred to as the "pressure-off" period, is likewise maintained relatively short to avoid any excessive particulate build-up at the filter between the cyclic cleaning operations. This on-off cycle continues until the entire process is shut down.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
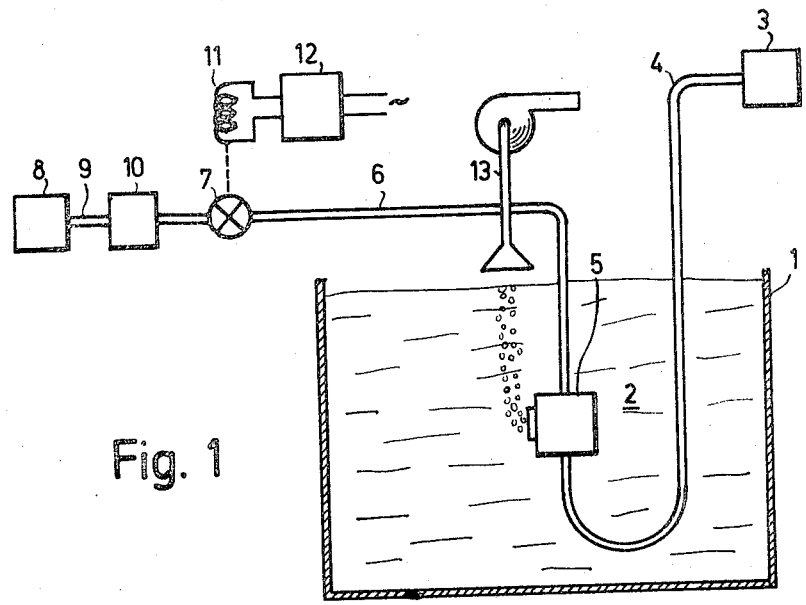
FIG. 1 schematically illustrates a filter system or installation equipped with a pressurized fluid medium apparatus and suitable for carrying-out continuous or continual analysis operations.

Describing now the drawing, in FIG. 1 there is schematically illustrated a filter installation constituted by a liquid container 1 housing the liquid, namely the bath 2, which is to be analyzed. The analysis apparatus has generally been indicated by reference character 3, and the constructional details thereof are unimportant to the understanding of the basic concepts of the present invention. In fact, it should be expressly understood that the exact nature of the construction of the analysis apparatus 3 is wholly unimportant as far as the teachings of the invention are concerned, it being remarked that any suitable analysis equipment can be conveniently employed. A sampling or suction line 4 is operatively connected at one end in flow communication with the analysis apparatus 3, the opposite end of this suction or sampling line communicating with a filter compartment, generally referred to by reference numeral 5. The exact details of the filter compartment 5 will be considered more fully hereinafter in conjunction with the description of FIGS. 2 and 3.

Continuing, it will be seen that a pressure line or conduit 6 leads in flow communication to the filter compartment 5, pressure line 6 being operably connected at its opposite end with a suitable control valve 7. The function of the control valve 7 is to periodically admit a supply of pressurized fluid medium through the line 6 to the filter compartment 5. With that function in mind, it will be apparent that many different types of control valves suitable for this purpose are known to the art and can be effectively utilized in the practice of the invention. The actual supply of pressurized fluid medium is delivered by a suitable source 8. This supply source 8 communicates via a conduit 9 with a pressure reducer and regulator 10 and then finally with the aforementioned control valve 7. Control valve 7 can be, for instance, actuated by an electromagnet 11 which, in turn, is switched-in and switched-out by the action of appropriate control pulses delivered for this purpose by a conventional timer 12.

The timing cycle of the timer 12 can be, for instance, selected such that the electromagnet 11 is switched-out for a period of, for instance 100 seconds, and switched-in for a period of, for instance, 0.5 seconds. Obviously, then, the control valve 7, in turn, will be correspondingly open for 0.5 seconds, during which time the pressurized fluid medium will flow from the source 8 through the line 9, then through the pressure regulator 10 to the control valve 7, and finally via the conduit 6 into the filter compartment 5. Since the compressed or pressurized fluid medium cannot flow-off via the suction or sampling line 4 (this suction line 4 in most cases being coupled to a flow pump of the analysis apparatus 3) such pressurized fluid medium is first forced to expel the liquid in the filter compartment 5 through the filter element and into the bath, and thereafter such pressurized fluid medium itself escapes through the filter element into the confines of the bath. By virtue of this backwashing of the filter element with the pressurized fluid medium, all, or at least the majority of the suspended particles, which have deposited upon the filter surface during sucking-up of the sample, and which may have possibly penetrated into the filter pores, are washed back into the bath 2. The pressurized fluid medium which has penetrated through the filter element ascends or bubbles-up through the bath 2, escaping into the atmosphere, or, if desired, doing so through the intermediary of a suitable venting or suction device 13.

Figure 2:
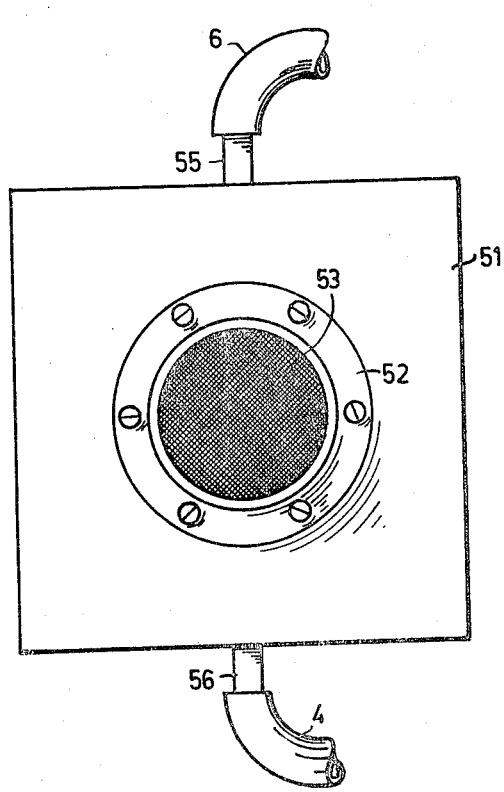
FIG. 2 is an enlarged plan view of a preferred form of filter element suitable for use in practicing the method aspects of the invention and employed in the filter installation of the arrangement of FIG. 1.
Figure 3:
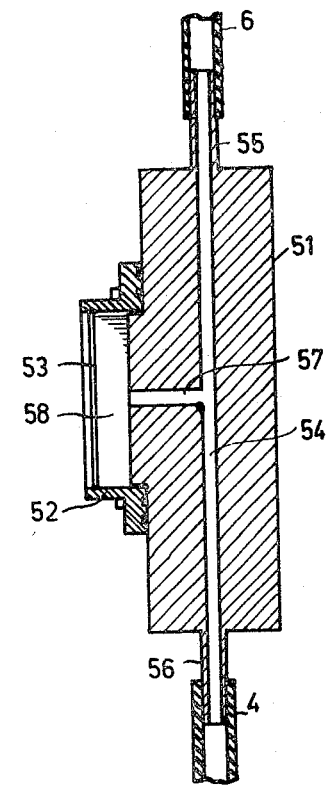
FIG. 3 is a cross-sectional view of the filter element depicted in FIG. 2, showing specific constructional details thereof.

Having now had the benefit of the description of the filter installation of FIG. 1 and its general manner of operation, attention is now directed to FIGS. 2 and 3 showing in plan view and in cross-sectional view, respectively, details of the filter compartment or means 5. Such will be seen to comprise a filter housing 51 and a filter disc or element 53 seated at the housing 51 through the action of a threaded flange or filter holder 52. While the use of a threaded filter holder 52 constitutes one convenient manner of attaching the filter element 53 with the filter housing 51, obviously it would be easily possible to resort to other attachment techniques. Further, the filter housing 51 is equipped with a throughpassing bore 54, open at both ends as clearly shown in FIG. 3, one end communicating with an inlet nipple or connection 55, the other end with an outlet nipple or connection 56. Furthermore, a transversely extending bore 57 coupled in flow relationship the bore 54 with a filter chamber or space 58 at the filter downstream side.

Now, as long as the control valve 7 is closed, then, the sample removed from the bath 2 by the suction line 4 is continuously withdrawn through the filter element 53. When the control valve 7 is open, then pressurized fluid medium flows from the line or conduit 6 through the bore 54 and the transverse bore 57 into the filter chamber or space 58, then through the filter element 53 itself, into the bath 2. As explained above, the surface of the filter element is thereby cleaned. Filter element 53 is preferably a thin filter element, a so-called surface filter as opposed to a depth filter, so that the frequent backwashing has a more intensive cleaning action; in some instances, in fact, allowing the filter element to be used without having to be replaced or manually cleaned.

Due to the intermittent cleaning of the filter surface, continuous or continual operation of the analysis apparatus 3 is possible, since the periodic blow of the pressurized fluid medium back through the filter element 53 does not disadvantageously affect the analysis apparatus 3. Moreover, the sample which is initially forced back through the filter during backwashing, immediately thereafter again flows back through the filter element or disc 53, again filling the filter chamber 58. As already mentioned heretofore, the short flow-time for the pressurized fluid medium through the filter element allows for uninterrupted sample flow, especially when the analysis equipment is provided with a de-bubbler which avoids upsetting of the analyzer and the controller, whereas the similarly relatively short-time intervals during which no pressurized fluid medium flows through the filter successfully prevents excessive particle build-up between the cleaning operations.

Furthermore, the inventive method and the exemplary embodiment of the apparatus for practicing same, not only affords the heretofore explained advantages, but additionally, it may be stated that a further advantage is realized inasmuch as no change in the make-up of the bath 2 occurs due to the penetration of the pressurized gaseous medium through the filter and the bath and its rising or bubbling-up through the bath to its surface. On the other hand, the prior art techniques resorting to cleaning of a filter element by using a liquid flushing agent bring about a change in the make-up or composition of the bath.

In practicing the invention, it is possible, in most cases, to utilize, as the pressurized fluid medium, air, it then being a relatively simple matter to provide as the source therefor a suitable supply of compressed air. However, in the event the chemical composition of the bath 2 is such that air, as the pressurized fluid medium, cannot be feasibly permitted to flow through the bath, particularly if the oxygen contained therein or any other constituents thereof might adversely affect the filtered sample, then the described method can be carried out with, and the described apparatus can utilize, as the pressurized medium a chemically inert gas, while importantly, the entire mode of operation described above remains unaltered.

While there is shown and described present preferred embodiments of the invention, it is to be distinctly understood that the invention is not limited thereto, but may be otherwise variously embodied and practiced within the scope of the following claims. ACCORDINGLY,

What is claimed is

1. In a method for the continuous withdrawal of samples from industrial process baths for analysis, the steps of:
  a. arranging a filter in the bath through which flows a sample of the bath from the filter infeed to the filter outfeed side;
  b. periodically applying surges of a pressurized fluid medium to the outfeed side of the filter;
  c. causing the thus applied surges of pressurized fluid medium to backflow through the filter in a direction opposite to the direction of flow of the sample through the filter;
  d. by means of the backflow of such pressurized fluid medium through the filter removing suspended bath particles which have deposited upon the surface of the filter at the sample infeed side thereof; and
  e. removing by suction from the bath the pressurized fluid medium which has penetrated into the bath.

2. The method as defined in claim 1, wherein the applied surges of pressurized fluid medium which backflows through the filter initially backwashes the liquid sample entrapped in the filter into the bath, and thereafter excess pressurized medium flows through the filter into the bath.

3. The method as defined in claim 1, including the step of utilizing a timer controlling a valve for regulating the periodic delivery of the pressurized fluid medium to the outfeed side of the filter independent of the clogging of the filter.

4. The method as defined in claim 3, including the step of controlling the periodic delivery of the surges of the pressurized fluid medium such that the time during which flow of the pressurized fluid medium to the outfeed side of the filter is cut-off and the time during which such flow is cut-on is in the ratio of at least 100:1.

5. The method as defined in claim 1, including the step of utilizing compressed air as the pressurized fluid medium.

6. In an apparatus for the continuous withdrawal of samples from industrial process baths and the like, comprising filter means provided with at least one filter element for filtering-out suspended particles from the bath, a source of pressurized fluid medium, conduit means for coupling in flow relationship said source of pressurized fluid medium with said filter means, control valve means for controlling the delivery of pressurized fluid medium from said source to said filter means, timer means operating said control valve means for selectively periodically opening and closing said control valve means, and suction means for removing at leas a portion of the pressurized fluid medium bubbling up through the bath to its surface.

7. The apparatus as defined in claim 6, wherein said source of pressurized fluid medium delivers compressed air.

8. The apparatus as defined in claim 6, further including pressure regulator means for said pressurized fluid medium interposed between said source of pressurized fluid medium and said control valve means.

* * * * *